(12) United States Patent
Hyatt

(10) Patent No.: US 7,633,587 B2
(45) Date of Patent: Dec. 15, 2009

(54) LIQUID CRYSTAL APERTURE IN A CAMERA

(75) Inventor: Edward Craig Hyatt, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 254 days.

(21) Appl. No.: 11/406,011

(22) Filed: Apr. 18, 2006

(65) Prior Publication Data

US 2007/0242201 A1 Oct. 18, 2007

(51) Int. Cl.
*G02F 1/1337* (2006.01)
*G02F 1/13* (2006.01)
*G02F 1/00* (2006.01)
*G03B 7/083* (2006.01)
*G03B 7/093* (2006.01)

(52) U.S. Cl. ............... 349/129; 349/200; 396/457; 396/249

(58) Field of Classification Search ............... 349/129, 349/200
See application file for complete search history.

(56) References Cited

U.S. PATENT DOCUMENTS

| | | | |
|---|---|---|---|
| 4,333,720 A | 6/1982 | Suzuki et al. | |
| 4,431,288 A | 2/1984 | Iwata et al. | |
| 5,097,352 A | 3/1992 | Takahashi et al. | |
| 5,434,687 A * | 7/1995 | Kawata et al. | 349/96 |
| 5,641,958 A | 6/1997 | Rudeen | |
| 6,512,563 B1 * | 1/2003 | Tajima | 349/123 |

FOREIGN PATENT DOCUMENTS

JP 02113224 4/1990

OTHER PUBLICATIONS

"Thin Film Camera Iris Using Liquid Crystalline Material," Originally disclosed in the IBM TDB (IBM Technical Disclosure Bulletin) [Mar. 1985], 1 page.

* cited by examiner

*Primary Examiner*—Andrew Schechter
*Assistant Examiner*—Paisley L Arendt
(74) *Attorney, Agent, or Firm*—Coats & Bennett, P.L.L.C.

(57) ABSTRACT

An electronic aperture comprises first and second polarizers and a liquid crystal layer disposed between the first and second polarizers. The liquid crystal layer comprises a plurality of liquid crystals having an angular orientation that varies as a function of position. In one exemplary embodiment, the angular orientation of the liquid crystals varies as a function of distance from an optical axis.

14 Claims, 7 Drawing Sheets

LIQUID CRYSTAL APERTURE IN A CAMERA

BACKGROUND

In recent years, mobile communication devices having built in cameras have become popular with consumers. Consumers can use cameras incorporated into their mobile communication devices to capture images, send and receive digital images, and/or participate in video conferences. Until recently, the demand for mobile communication devices with built-in cameras has not been very high because the built-in camera makes the mobile communication device prohibitively expensive. However, as technology improves and costs decrease, the demand for built-in cameras will continue to grow.

To meet the growing demand for built-in cameras, product manufacturers will need to find ways to improve camera modules for mobile communication devices. Currently, most camera modules for mobile communication devices have a fixed aperture controlling the amount of light that reaches the light sensor. Exposure control and compensation for varying light conditions is performed in software. In contrast, most digital cameras have a variable aperture that allows the consumer to select a desired aperture size, which is often referred to as an F stop.

While it would be desirable to have a variable aperture for a camera module in a mobile communication device, space limitations have hindered the widespread adoption and use of variable apertures. In conventional cameras, a mechanical iris is used to provide a variable size aperture for exposure control. A mechanical iris typically comprises a series of overlapping leaves attached to a surrounding ring. The ring may be turned manually or by a motor. As the ring is turned, the iris leaves expand or contract to vary the size of the aperture. In general, the space requirement for a mechanical iris is too large for most mobile applications where space is a precious commodity. Therefore, there is a need for an alternative to a conventional mechanical iris that is better suited for mobile applications.

SUMMARY

The present invention relates to a liquid crystal aperture for controlling the amount of light transmitted along an optical axis. The liquid crystal aperture comprises first and second polarizers, and a liquid crystal layer disposed between the first and second polarizers. The liquid crystal layer is configured such that the angular orientation or director angle of the liquid crystals varies as a function of position. In one exemplary embodiment, the director angle varies as a function of distance from an optical axis. In some embodiments, the variations in angular orientation may occur in discrete steps. In other embodiments, the angular orientation may vary continuously.

The electronic aperture may be used, for example, in a built-in camera for a mobile communication device to provide a variable aperture. The electronic aperture may also be used as a special effects filter to create special effects.

DETAILED DESCRIPTION

Figure 1:
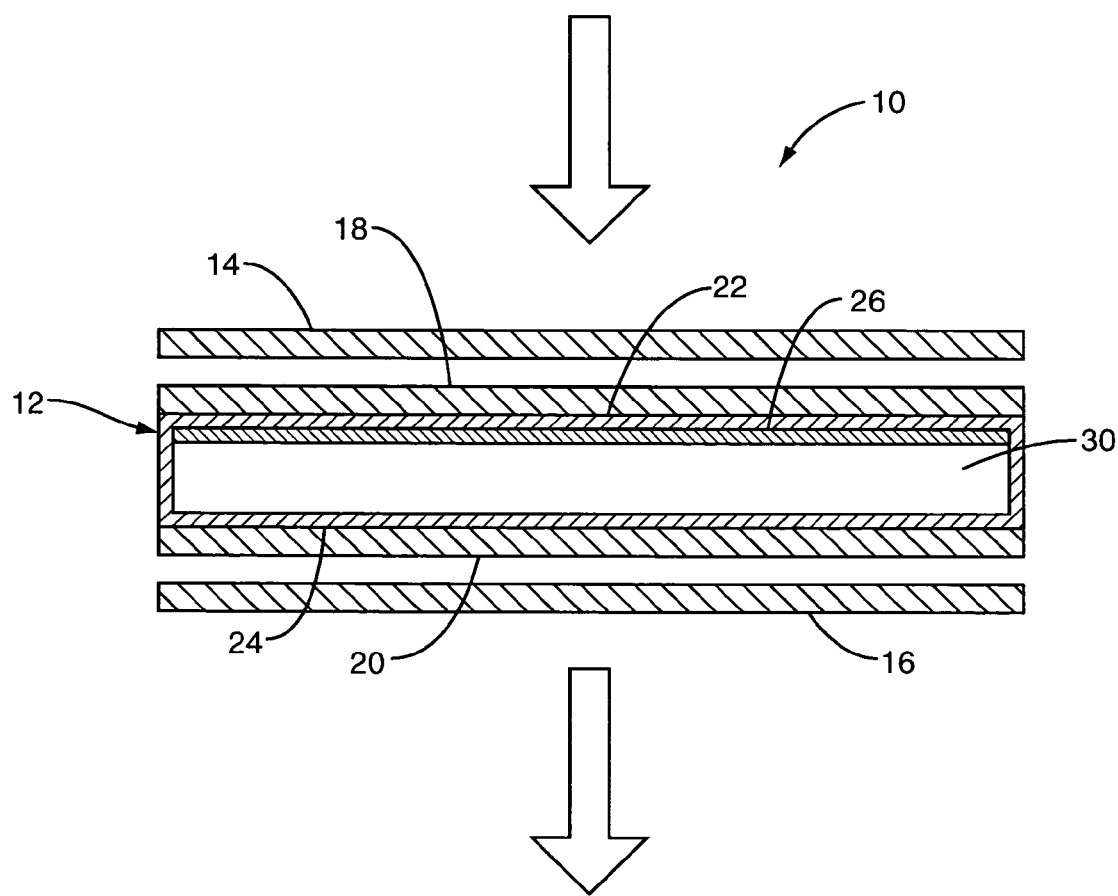
FIG. 1 is a cross-section through an exemplary liquid crystal aperture.

Turning now to the drawings, FIG. 1 is a cross-section showing the basic structure of an exemplary liquid crystal aperture 10. The liquid crystal aperture 10 comprises a liquid crystal layer 12 disposed between a pair of polarizing layers 14, 16. The liquid crystal layer 12 contains twisted nematic (TN) liquid crystals or super-twisted nematic (STN) liquid crystals. The first polarizing layer 14 polarizes light entering the aperture 10. The liquid crystal layer 12 causes the polarization axis of the light to rotate. The second polarizing layer 16 functions as a shutter to control the amount of light that leaves the aperture 10. In general, the amount of light that is transmitted through the liquid crystal aperture 10 will vary depending on the polarization axis of the light. When the polarization axis of the light is aligned with the polarization axis of the second polarization layer 16, then the light will be transmitted with only minimal losses. When the polarization axis of the light is orthogonal to the polarization axis of the second polarization layer 16, then the light will be blocked. Varying degrees of light transmission can be obtained by changing the polarization angle of the light, which is the function of the liquid crystal layer 12.

The liquid crystal layer 12 comprises first and second transparent substrates 18, 20 made of glass or plastic film. Transparent electrodes 22, 24 are applied to the surfaces of the first and second substrates 18, 20. The transparent electrodes 22, 24 are connected to a voltage controller 30 (shown in FIG. 7) that controls the voltage applied to the transparent electrodes 22, 24. As will be hereinafter described, the control voltage applied to the transparent electrodes 22, 24 causes the liquid crystals to twist or untwist as they try to align with the electric field. An orientation layer 26 is applied to the first substrate 18 to orient the liquid crystals in a desired neutral orientation.

Figure 2:
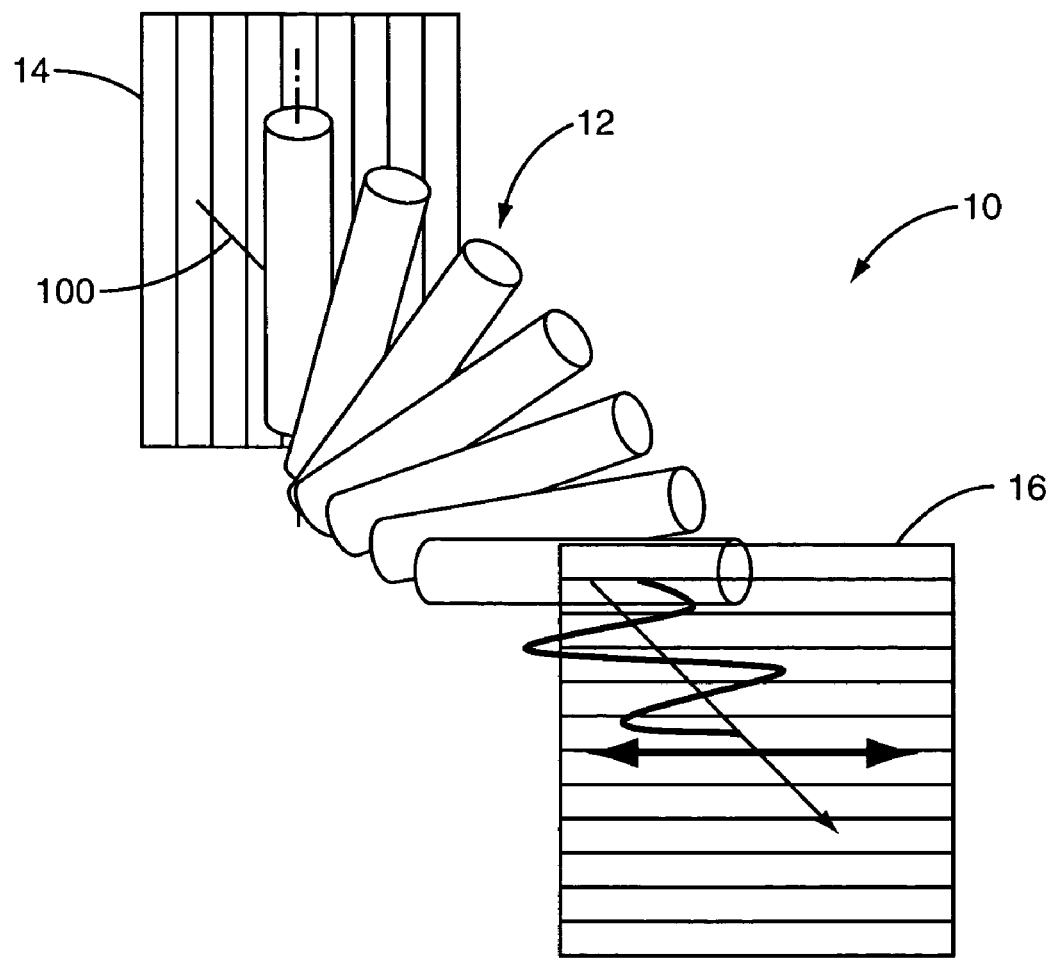
FIG. 2 is a schematic diagram illustrating the basic operation of an exemplary liquid crystal aperture showing the liquid crystals in a relaxed (twisted) state.
Figure 3:
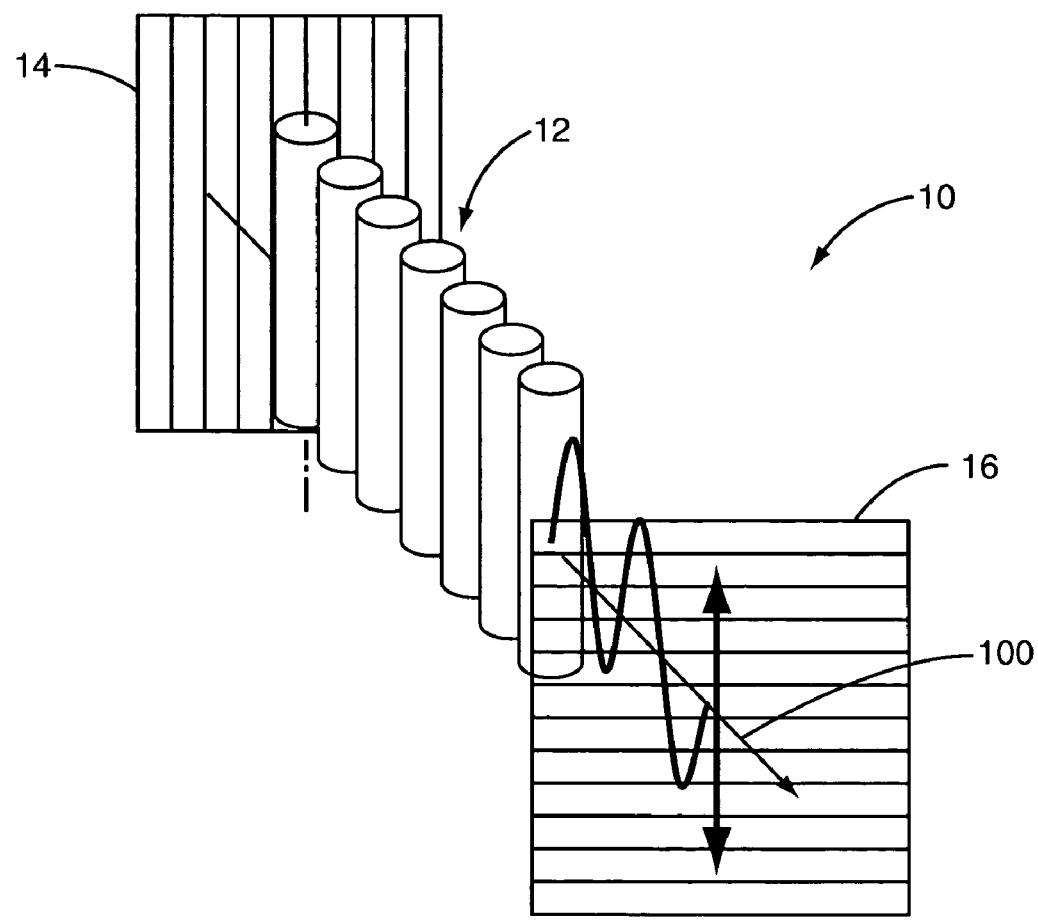
FIG. 3 is a schematic diagram illustrating the basic operation of an exemplary liquid crystal aperture showing the liquid crystals in an excited (untwisted) state.

FIGS. 2 and 3 illustrate the basic operation of the electronic aperture 10. In this simplified example, the polarization axes of the first and second polarizing layers 14, 16 are orthogonal, i.e. disposed at a relative 90° angle. Light passing through the first polarizing layer 14 is polarized along the polarization axis of the first polarizing layer 14, which in this example is vertical. The liquid crystals in the liquid crystal layer 12 rotate the polarization axis of the light 90°. When the control voltage $V_C=0$, the polarization of the light exiting the liquid crystal layer 12 matches the polarization axis of the second polarizing layer 16, which in this example is horizontal. Thus, light exiting the liquid crystal layer 12 passes through the second polarization layer 16 with only negligible loss.

When the control voltage $V_C$ is increased, the liquid crystals will untwist as they try to align themselves with the electric field. The degree of untwisting is dependent on the applied voltage. When the control voltage $V_C$ reaches a voltage $V_{MAX}$, the liquid crystals will align with the electric field and will be oriented in a vertical direction as shown in FIG. 3. In this orientation, the light exiting the liquid crystal layer 12 is orthogonal to the second polarization layer 16. Thus, the light is completely blocked. Varying degrees of light transmission can be obtained by varying the amount of the control voltage $V_C$, which in turn varies the angular offset between the polarized light and the second polarization layer 16. For example, a 30° angular offset will result in 75% of the light being transmitted. A 60° offset will result in only 25% of the light being transmitted.

In the simplified examples shown in FIGS. 2 and 3, the light transmissivity characteristic of the aperture is assumed to be uniform across the entire aperture 10. With some modifications to the basic structure of the aperture 10, the light transmissivity characteristic of the aperture 10 can vary throughout the area of the liquid crystal aperture 10. As one example, the light transmissivity characteristic can be made to vary as a function of distance from an optical axis 100. In most applications, the optical axis 100 will correspond to the center of the liquid crystal aperture 10. Also, the aperture 10 will, in most applications, be circular but other shapes may also be used.

The variable light transmissivity characteristic is achieved in one exemplary embodiment by varying the angular orientation of the liquid crystals at different positions in the liquid crystal aperture 10. Typically, microscopic grooves are formed in the orientation layer 26 by a "rubbing" process to orient the liquid crystals in a desired neutral orientation. The pattern made by the microscopic grooves is referred to herein as the rubbing pattern. Conventionally, the rubbing pattern or grooves in the orientation layer 26 are parallel to the polarization axis of the first polarization layer 14. The grooves cause the director angle in the first layer of liquid crystals to align with the polarization axis of the first polarization layer 14 so that no light is blocked from entering. The orientation of the director angle of the liquid crystals may be changed by changing the rubbing pattern in different areas or sections of the liquid crystal aperture 10. Changing the orientation of the grooves in the orientation layer 26 causes the orientation of the director angle of the liquid crystals to change and, thus, changes the light transmissivity characteristic as a function of the applied control voltage.

Figure 4:
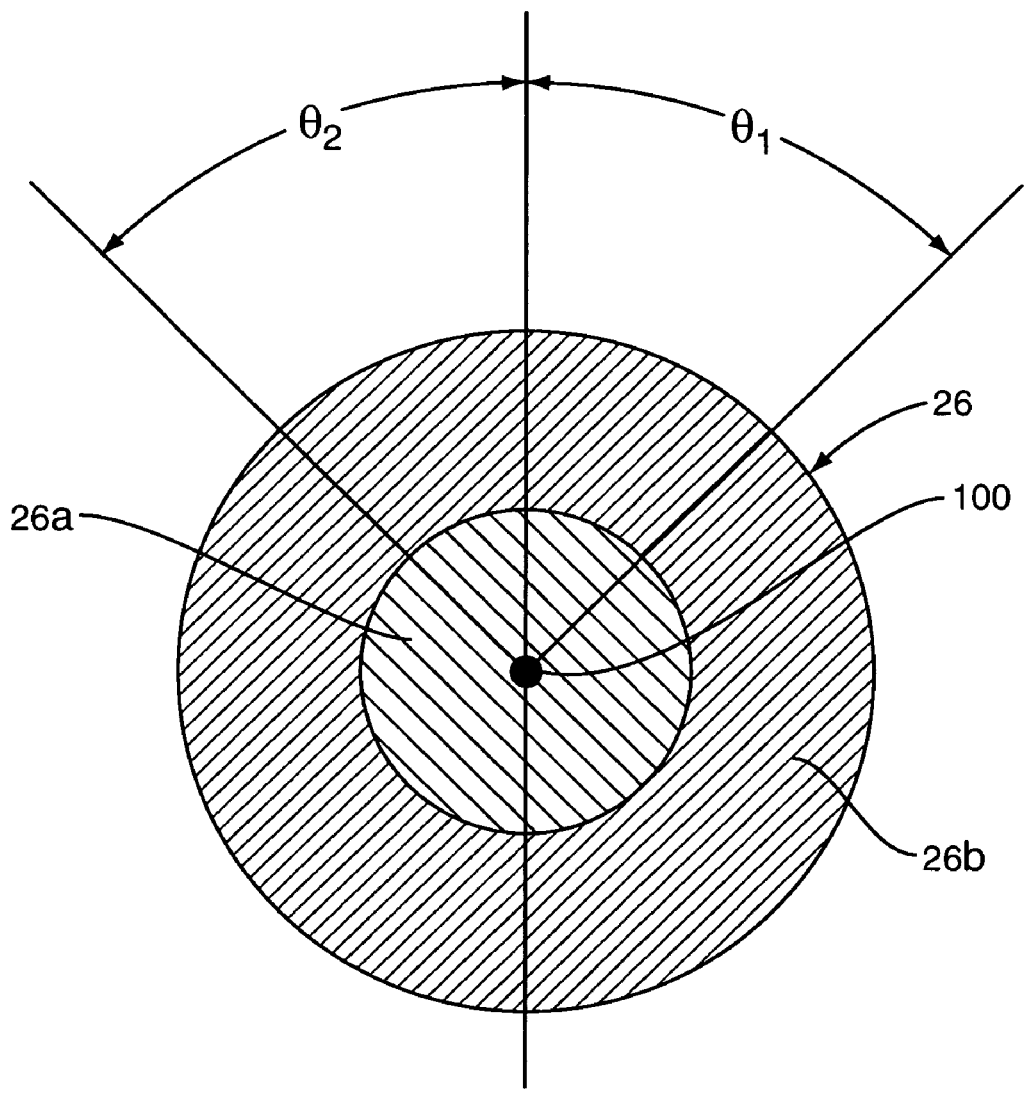
FIG. 4 is a diagram illustrating an exemplary rubbing pattern to vary the light transmissivity characteristic of the aperture as a function of distance from an optical axis.

FIG. 4 illustrates a rubbing pattern applied to the orientation layer 26 that may be used to vary the neutral orientation angle of the liquid crystals in one exemplary embodiment. The area of the liquid crystal aperture 10 is divided into two or more distinct sections. The exemplary embodiment shown in FIG. 4 has two sections, denoted herein as the central section 26a and the outer section 26b. In the central section 26a, the rubbing angle of the orientation layer 26 is rotated 30° clockwise relative to a vertical line. In the outer section 26b, the rubbing angle of the orientation layer 26 is rotated 30° counterclockwise relative to a vertical line. While only two sections are shown, those skilled in the art will appreciate that a larger number of sections can be defined.

It is preferred, but not required, that the polarization axis of first polarization layer 14 be the same as the rubbing angle. Thus, the first polarization layer 14 will use the same pattern applied to the orientation layer 26. In this example, the first polarization layer 14 includes a central section 26a and outer section 26b corresponding to the central and outer section 26bs of the orientation layer 26. The polarization axis of the central section 26a of the first polarization layer 14 is parallel to the rubbing pattern in the central section 26a of the orientation layer 26. The polarization axis in the outer section 26b of the first polarization layer 14 is parallel to the rubbing angle in the outer section 26b of the orientation layer 26.

Figure 5:
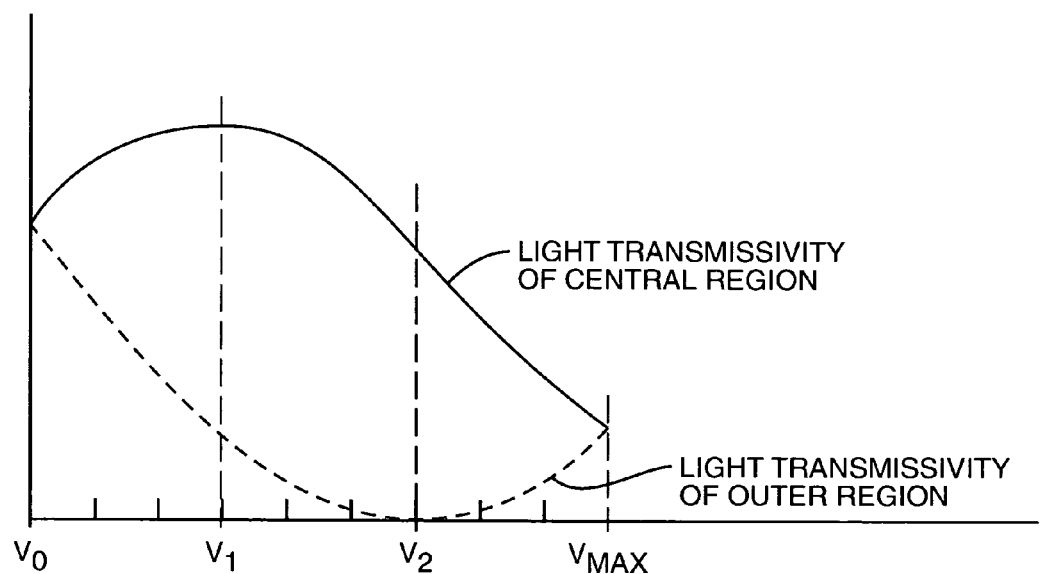
FIG. 5 is a graph illustrating the light transmissivity characteristic of an exemplary aperture.
Figure 6A:
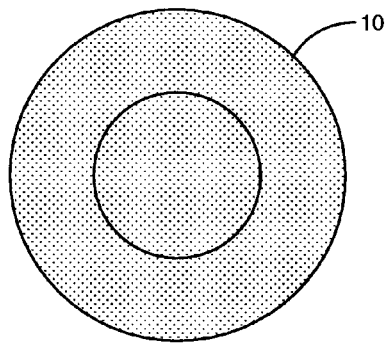
FIGS. 6A-6D illustrate the variable light transmissivity of an exemplary liquid crystal aperture.
Figure 6A:
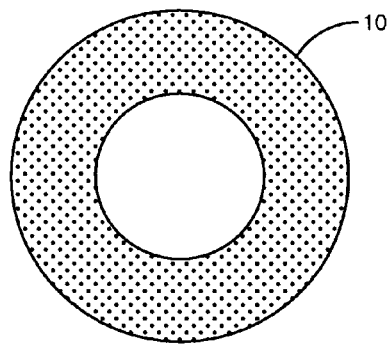
Figure 6A:
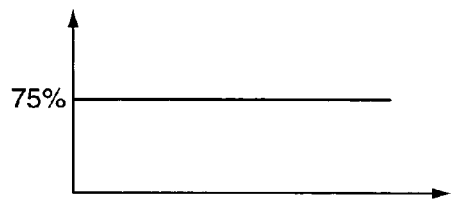
Figure 6B:
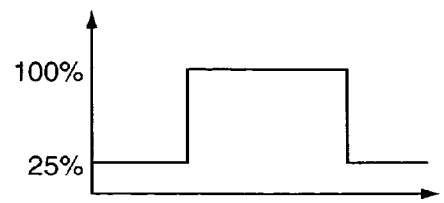
Figure 6C:
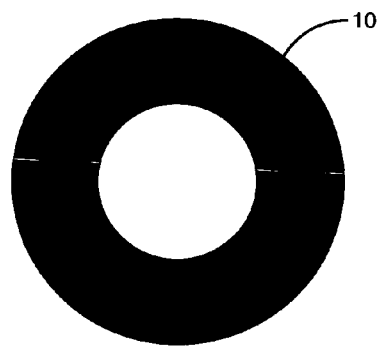
Figure 6C:
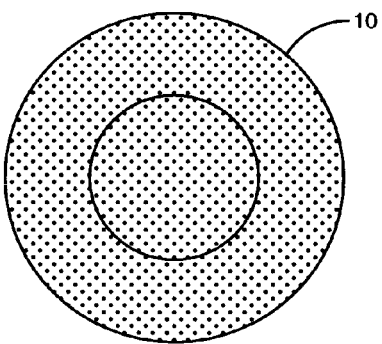
Figure 6C:
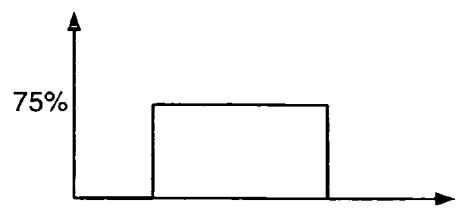
Figure 6D:

The graph shown in FIG. 5 illustrates how the changing orientation of the director angle of the liquid crystals affects the light transmissivity characteristic. In FIG. 5, the solid line represents the light transmissivity characteristic of the central section 26a of the aperture 10 as a function of the control voltage, and the dotted line represents the light transmissivity characteristic of the outer section 26b of the aperture 10 as a function of the control voltage. The horizontal axis represents the applied control voltage that causes the liquid crystals to untwist. The vertical axis represents the amount of light transmitted. When the control voltage $V_C=V_0$, both sections of the aperture transmit the same amount of light. The amount of light transmitted by the central section 26a initially increases as the voltage increases and reaches its maximum transmissivity when $V_C=V_1$, which causes a 30° rotation of the liquid crystals. As the control voltage $V_C$ is increased above $V_1$, the light transmissivity decreases. When the control voltage $V_C=V_2$, which causes 60° of rotation of the liquid crystals, the light transmissivity of the central section 26a is the same as $V_C=V_0$. The amount of light transmitted by the outer section 26b initially decreases as the control voltage $V_C$ increases and reaches its minimum transmissivity at a voltage $V_2$, which causes a 60° rotation of the liquid crystals. As the control voltage $V_C$ is increased above $V_2$, the light transmissivity of the outer section 26b begins to increase. When $V_C=V_{MAX}$, both the outer and inner sections 26b, 26a transmit approximately 25% of the light that enters.

FIGS. 6A-6D illustrate the light transmissivity of the liquid crystal aperture 10 at four control voltage settings $V_0$, $V_1$, $V_2$ and $V_{MAX}$. At $V_0$ (FIG. 6A), the liquid crystal aperture 10 has a uniform transmissivity. Both the central section 26a and outer section 26b of the liquid crystal aperture 10 transmit approximately 75% of the light. At $V_1$ (FIG. 6B), the central section 26a of the liquid crystal aperture 10 is clear and transmits approximately 100% of the light. The outer section 26b transmits only about 25% of the light so that a light gradient as a function of distance from the center of the aperture 10 is produced. At $V_2$ (FIG. 6C), the central section 26a of the liquid crystal aperture 10 transmits approximately 75% of the light. The outer section 26b blocks all light. At $V_{MAX}$ (FIG. 6D), the liquid crystal aperture 10 again has a uniform transmissivity. Both the central section 26a and outer section 26b of the liquid crystal aperture 10 transmit approximately 25% of the light.

The liquid crystal aperture 10 is useful to control exposure levels in a camera. Settings $V_0$ and $V_{MAX}$ may be used, for example, for low light conditions and bright light conditions, respectively. Setting $V_0$ is advantageous because it provides substantially uniform transmissivity across the entire area of the liquid crystal aperture 10 while allowing most of the light to pass. While some light is lost at setting $V_0$, it is possible to compensate for such losses with some software exposure control. At setting $V_2$, the outer section 26b of the liquid crystal aperture 10 is effectively turned off. The net effect is to create a smaller aperture, which is useful for exposure control in bright light conditions. These settings also provide some control over the depth of field. Setting $V_1$ provides maximum transmissivity in the central section 26a of the liquid crystal aperture 10 with substantial losses in the outer section 26b. This setting could be used, for example, as a special effects filter so that images appear bright in the center and dark at the periphery.

Figure 7:
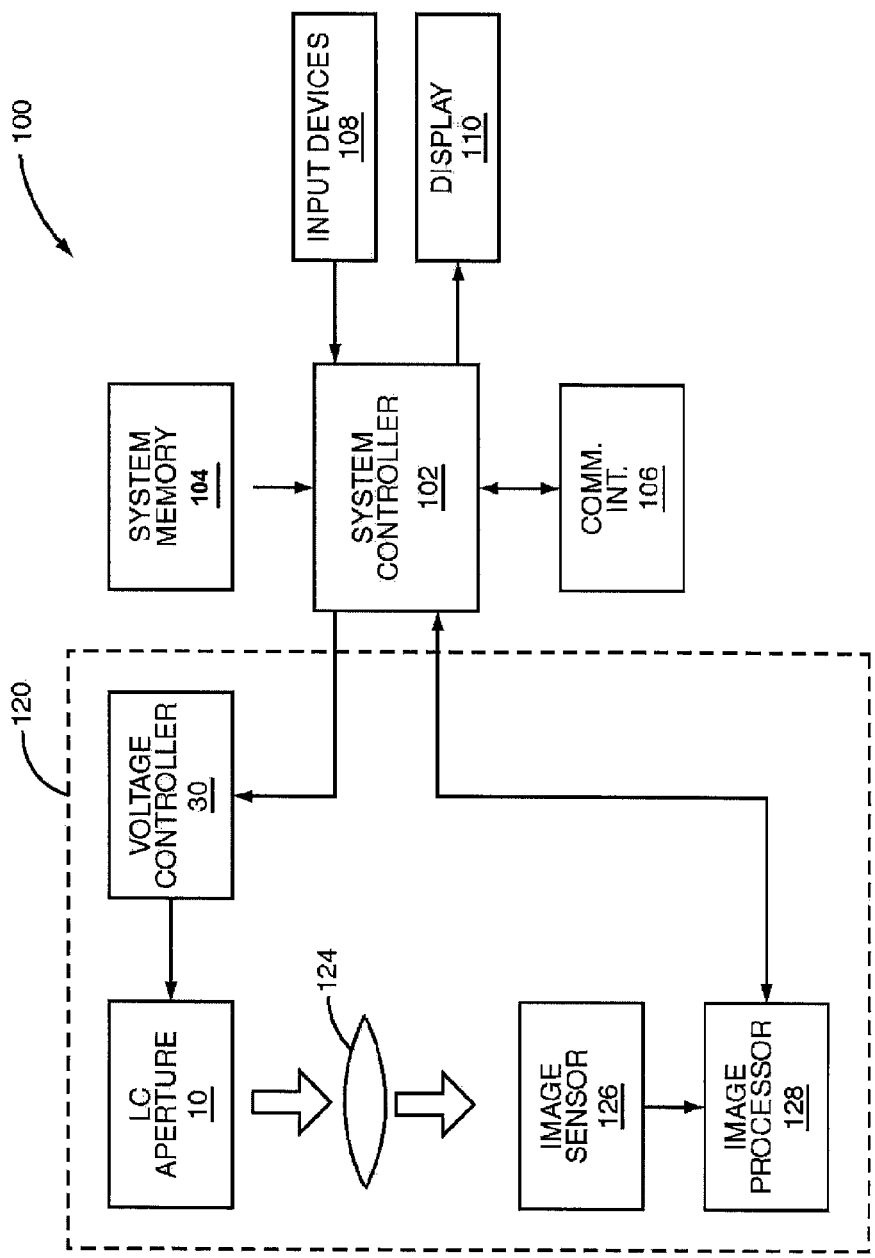
FIG. 7 is a schematic diagram of a camera module incorporating an exemplary liquid crystal aperture configured to provide exposure control in a camera.

FIG. 7 is a block diagram of an exemplary combination mobile communication device 100 incorporating a camera module 120 including the exemplary liquid crystal aperture 10 for exposure control. The mobile communication device 100 may comprise, for example, a cellular telephone, a satellite telephone, a personal digital assistant (PDAs), a palm-top computer, a lap-top computer, or the like. The mobile communication device 100 includes a system controller 102 to control overall operation of the mobile communication device 10, system memory 104 to store programs and data needed for operation, communication interface 106 for communicating with remote devices, input devices 108 for receiving user input, and a display 110 to display information for viewing by the user. Camera module 120 comprises liquid crystal aperture 10, lens assembly 124, image sensor 126, and image processor 128. Liquid crystal aperture 10 controls the amount of light that enters the camera module 120 as previously described. Lens assembly 124, comprising a single lens or a plurality of lenses, collects and focuses the admitted light onto image sensor 126. Image sensor 126 captures images formed by light collected and focused by lens assembly 124. Image sensor 126 may be any conventional image sensor 126, such as a charge-coupled device (CCD) or a complementary metal oxide semiconductor (CMOS) image sensor. Image processor 128 processes raw image data captured by image sensor 126 for subsequent storage in a memory 104, output to display 110, and/or for transmission by communication interface 106. The image processor 128 may be a conventional digital signal processor programmed to process image data, which is well known in the art.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An electronic aperture in a camera comprising:
   first and second polarizers disposed along an optical axis of the camera; and
   a liquid crystal layer disposed between said first and second polarizers, said liquid crystal layer comprising a plurality of liquid crystals having neutral angular orientations that vary as a function of distance from said optical axis and are constant at any given distance from said optical axis.

2. The electronic aperture of claim 1 wherein the electronic aperture includes a first section with said liquid crystals oriented in a first neutral angular orientation, and a second section, concentric to the first section, with said liquid crystals oriented in a second neutral angular orientation.

3. The electronic aperture of claim 1 wherein said liquid crystal layer comprises first and second transparent substrates with liquid crystals disposed between, and an orientation layer having a plurality of grooves to orient said liquid crystals at said neutral angular orientation.

4. The electronic aperture of claim 3 further comprising first and second transparent electrodes applied to said first and second substrates, respectively, to generate an electric field to vary the light transmissivity of the electronic aperture.

5. The electronic aperture of claim 1 wherein a polarization axis of said first polarizer varies with the neutral angular orientation of the liquid crystals.

6. A method of controlling an amount of light transmitted along an optical axis in a camera, said method comprising:
   polarizing light by transmitting said light through a first polarizer;
   rotating the polarized light output from the first polarizer by transmitting the light through a liquid crystal layer comprising a plurality of liquid crystals, the neutral angular orientations of which vary as a function of distance from said optical axis and are constant at any given distance from said optical axis; and
   transmitting light output from said liquid crystal layer through a second polarizer.

7. The method of claim 6 further comprising varying an amount of light output by the second polarizer by applying an electric field to said liquid crystal layer.

8. The method of claim 7 wherein the amount of light output from the second polarizer varies as a function of distance from said optical axis when an electric field is applied.

9. The method of claim 8 wherein the amount of light output from the second polarizer is substantially the same for all distances from said optical axis when said electric field is removed.

10. A camera module comprising:
    a liquid crystal aperture configured to provide exposure control, said liquid crystal aperture including first and second polarizers disposed along an optical axis and a liquid crystal layer between said first and second polarizers, said liquid crystal layer comprising a plurality of liquid crystals having neutral angular orientations that vary as a function of distance from said optical axis and are constant at any given distance from said optical axis;
    a lens assembly for focusing light admitted by said liquid crystal aperture; and
    an image sensor responsive to said focused light to form an image.

11. The camera module of claim 10 wherein the liquid crystal aperture includes a first section with said liquid crystals oriented in a first neutral angular orientation, and a second section, concentric to the first section, with said liquid crystals oriented in a second neutral angular orientation.

12. The camera module of claim 10 wherein said liquid crystal layer comprises first and second transparent substrates with said liquid crystals disposed between, and an orientation layer applied to at least said first substrate to orient said liquid crystals in a desired neutral angular orientation.

13. The camera module of claim 12 further comprising first and second transparent electrodes applied to said first and second substrates, respectively, to generate an electric field to vary the light transmissivity of the electronic aperture.

14. The camera module of claim 10 wherein a polarization axis of said first polarizer varies with the neutral angular orientation of the liquid crystals.

* * * * *

UNITED STATES PATENT AND TRADEMARK OFFICE
CERTIFICATE OF CORRECTION

PATENT NO.       : 7,633,587 B2                                          Page 1 of 1
APPLICATION NO.  : 11/406011
DATED            : December 15, 2009
INVENTOR(S)      : Edward Craig Hyatt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 293 days.

Signed and Sealed this

Twenty-first Day of December, 2010

David J. Kappos
*Director of the United States Patent and Trademark Office*